Dec. 2, 1947. R. A. ENGELHARDT 2,431,999
ELECTRICAL CONNECTOR BLOCK
Filed July 25, 1944 2 Sheets-Sheet 1

Inventor
RICHARD A. ENGELHARDT
By Donald W. Ferrington
Attorney

Dec. 2, 1947.        R. A. ENGELHARDT         2,431,999
                  ELECTRICAL CONNECTOR BLOCK
              Filed July 25, 1944          2 Sheets-Sheet 2
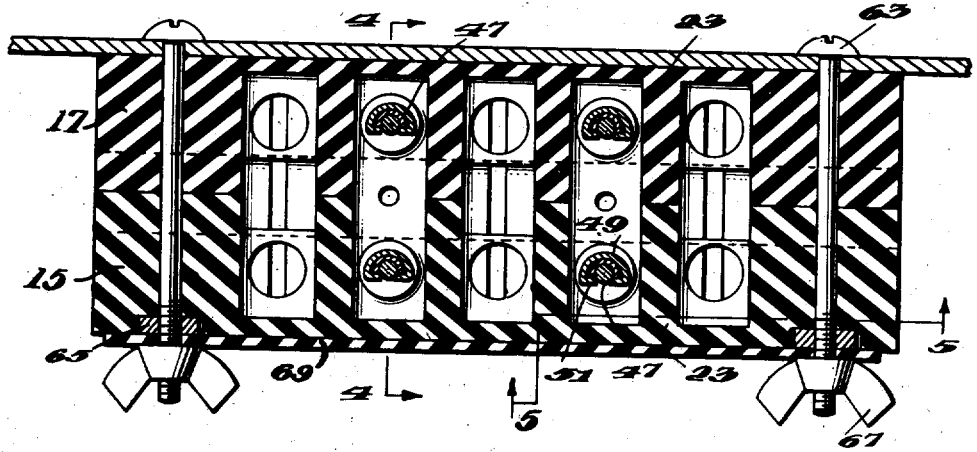
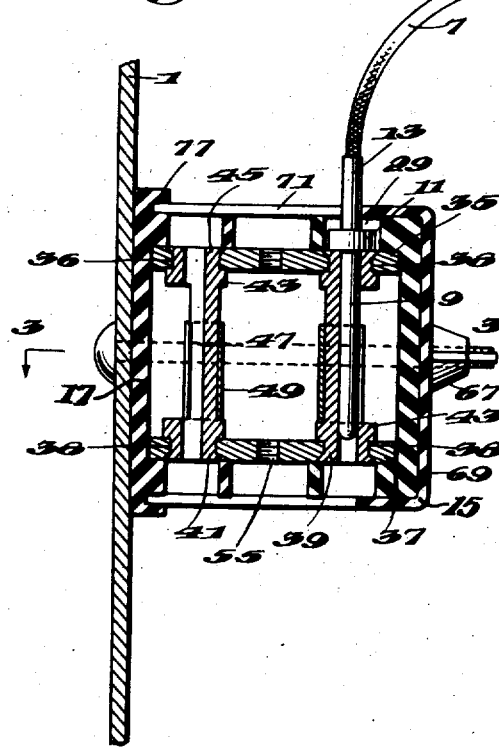
Inventor
RICHARD A. ENGELHARDT
By Donald W. Farrington
                Attorney Patented Dec. 2, 1947

2,431,999

UNITED STATES PATENT OFFICE 2,431,999

ELECTRICAL CONNECTOR BLOCK

Richard A. Engelhardt, Parkville, Md., assignor to The Glenn L. Martin Company, Middle River, Md., a corporation of Maryland Application July 25, 1944, Serial No. 546,466

8 Claims. (Cl. 173—328)

This invention relates to a multiple circuit junction box, and more particularly to a junction box whereby a plurality of electrical circuits may be quickly attached or detached therein.

An object of the invention is to provide a simple, rugged construction wherein the various circuits into and from the junction box or connector block may be quickly made or detached by means of cables having cylindrical tips. It is many times necessary to replace one or more conductors which are joined to a second set of conductors with rapidity and assurance, as for instance, the cables between various bulkheads of an aircraft which has been damaged. Modern aircraft, particularly bombers, have involved electrical circuits for their various accessories and operational necessities, and it is customary to have a complete set of wires for a unit running between the bulkheads so that if one group of electrical cables is incapacitated the group in the bulkhead can be removed and a spare group put in its place with ease and rapidity.

The present invention insures that the individual electrical conductors will be properly connected in the block so that a bundle of replacement cables can be very readily installed in the junction box and after installation the conductors are maintained in fixed position by a novel form of spring clip which prevents their displacement by vibration or the like.

It is also customary in military aircraft to have the junction boxes sealed by the Government inspector, and with the present invention this sealing may be readily accomplished and assures that the conductors are in their proper places. The seal itself can be attached to the junction box so that any unauthorized tampering will be immediately detected.

In the drawings:

Fig. 3 is a horizontal section through the terminal block taken on line 3—3 of Fig. 4;

Fig. 4 is a vertical section taken on line 4—4 of Fig. 3 showing the position of one of the wires leading to the block and the arrangement of the electric terminal holding members; and Fig. 5 is a fragmental vertical section taken on line 5—5 of Fig. 3 illustrating further details of the electric terminal holding members.

Figure 1:
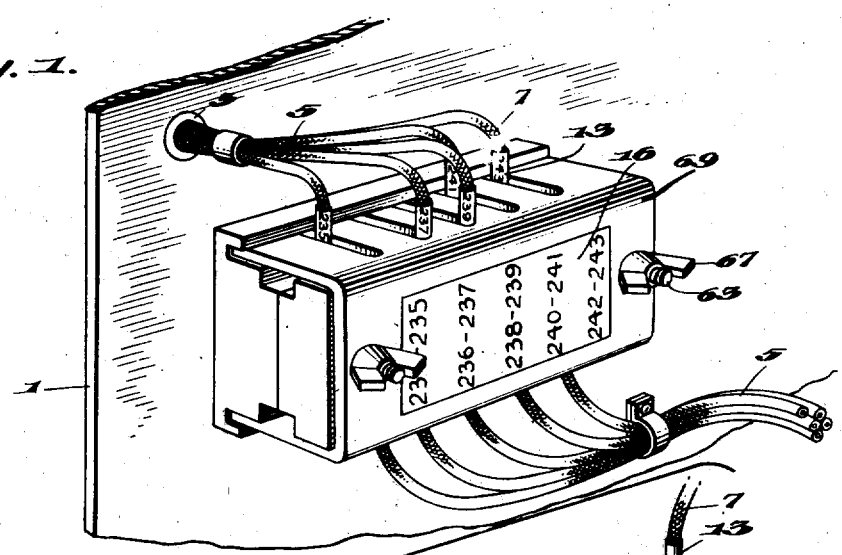
Fig. 1 is a perspective view of a complete terminal block showing the manner of mounting the same on a panel, together with the means of assembly and confining the central circuit wires leading to and from the block.

The present invention is ordinarily intended to be placed on a vertical member or wall between the bulkheads indicated by the numeral 1, and the wires coming from beyond the bulkhead are threaded through a grommet 3 into a bundle 5 and each individual conductor 7 terminates in a push plug tip 9 crimped or soldered on to the conductor. These push plugs are preferably provided with enlarged annular flanges 11 and an indicia collar or signal 13, which may be of some particular color or provided with a number or code so that the proper cable is always inserted in the proper socket. The colors or code number on the conductors correspond with an indicia plate as will be hereinafter described.

Essentially the junction block consists of two box-like housings of insulating material 15 and 17 which are adapted to be placed in parallel arrangement and held together by suitable fasteners. These blocks or strips 15 and 17 of insulating material are substantially T-shaped at their ends, with the intermediate space between the end members 19 and 21 thereof divided into identical cells 22 by a suitable number of spaced vertical partitions 23. The top and bottom walls 25 and 27 of the blocks 15 and 17, respectively, are provided with openings 29 between each of the partitions 23. These openings 29 in both the top and bottom walls of the insulating plugs between the partitions are of a size to accommodate the annular collar 11 of the detachable conductor plugs 9.

The cellular box-like members 15 and 17 may be fabricated in any convenient manner from any suitable dielectric plastic material. The two insulating bars 15 and 17 are substantially identical and the general principles of the invention may be carried out where the insulating bars are in fact identical. Preferably, however, the inner bar 17 is provided with an offset groove 73 at its rear edges for retaining the edge of a cover member and a wire code plate or surface 16 is formed on the front of the outer bar 15 for indicating the position of the various wire terminals corresponding with the indicia 13 on the various terminals 9.

Figs. 2, 3, 4 and 5 show the details of the novel electrical conductors or bus bars through which the electrical circuits are established and which receive the conductor pins 9. These electrical conductor units comprise a pair of metal bars 35 and 37 arranged in spaced parallel relation by a pair of spaced tubular members 39 and 41 which extend through apertures 36 and 38 formed adjacent the ends of the conductor bars 35 and 37. Fig. 4 shows the relationship of the tubular members 39 and 41 and conductor members 35 and 37 together with the manner of securing the tubular members 39 and 41 within apertures 36 and 38 of the contact bars. Here the tubular members 39 and 41 are provided with upper and lower annular stop collars 43 while the outer ends 45 of the tubular members are spun over or swaged in the beveled edge openings 36 and 38 in the bars. This specific construction is optional as the salient point is to have the ends of the tubular members in good electrical contact with and terminating flush with the outer surfaces of the bars 35 and 37.

The inner diameters or bores of the tubular members 39 and 41 are such a size that the conductor pins 9 are readily fitted therein. As shown in the several figures the portions of the tubular members 39 and 41 intermediate the annular collars 43 are cut away at 47 so that normally their bores are exposed. It will be observed that the cut-away portions 47 are slightly less than half the diameter of the tubular members, therefore when the plugs 9 are inserted therein a portion of the periphery of the plug will be exposed but it can be pulled out laterally. Each of these tubular members 39 and 41 is provided with a U-shaped clip or connector 49 made of spring metal with the free spaced side edges 51 thereof bent inwardly on the same plane. The free, spaced apart ends 51 contact the side edges of the cut-away portions 47 and extend inwardly so that when the plug 9 is inserted from either end of the tubular member it will be frictionally engaged by the free edges 51 of spring clips 49. The spring clips 49 may extend the entire length between the annular collars 43 on the tubular members, or the clips may be less than this distance, but in any event plugs 9 will frictionally engage the free ends 51 thereof and be held in excellent electrical contact.

Figure 2:
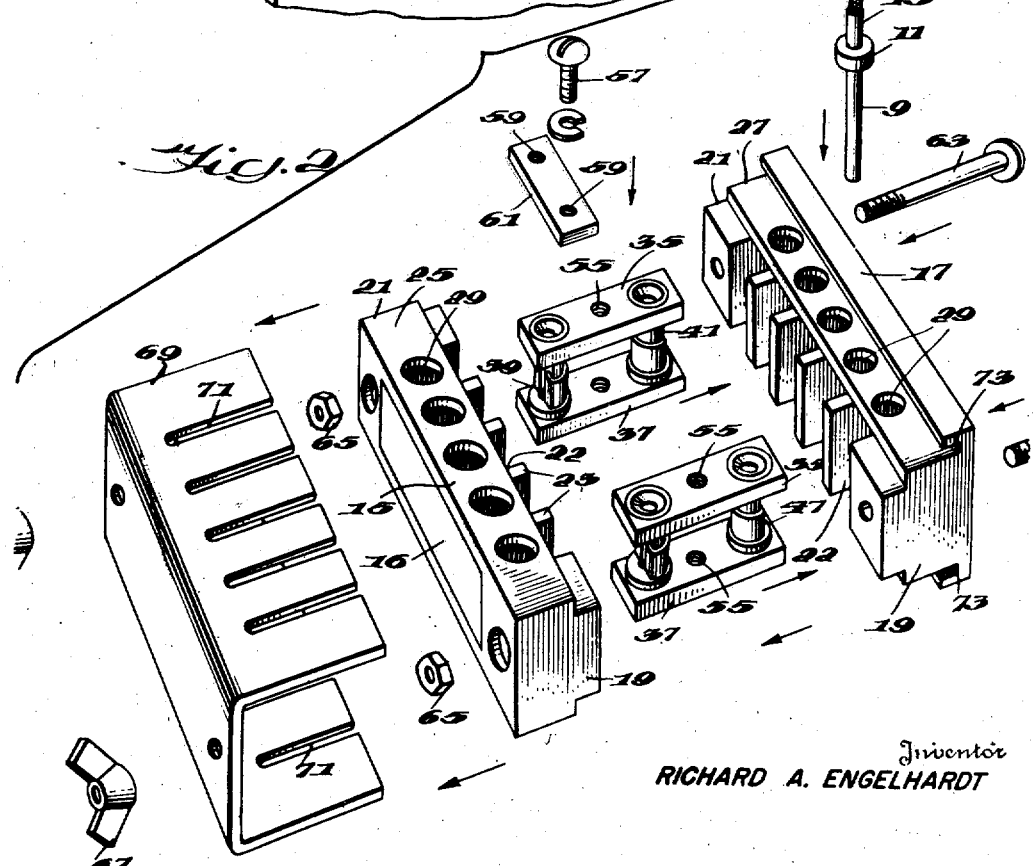
Fig. 2 is a perspective view of the terminal block with the several components thereof shown in opened up and spaced relation.

Referring now to Fig. 2, it will be observed that a series of these electrical conductor units are placed in the spaces 22 in the insulation blocks defined by the partitions 23 thereof and that the width of the top and bottom plates 35 and 37 of the connector units will snugly fill the space defined by the partitions and top and bottom members. In assembled position openings 29 formed in the sides of the insulating blocks register with the tubular openings of the connector units so that the plugs 9 can be readily placed in the proper tubular members 39 and 41 or removed therefrom. In some instances it is desirable to have adjacent connector units electrically joined together and for this purpose the top and bottom bars 35 and 37 are screw tapped, as indicated by numerals 55, for engagement by a threaded member 57 which is adapted to pass through openings 59 in a conductor bar or bridge 61.

Ordinarily the parallel pair of insulating blocks 15 and 17 with their plurality of electric connector units are assembled and held in fixed position by headed bolts 63 passing through suitable registering openings in the insulating blocks and retained by nuts 65 positioned in depressions in the outer block. Blocks 15 and 17 may have grooves formed in the sides to accommodate flush spring clips to hold the blocks with the metallic parts assembled therein, or any other suitable means may be provided to hold the blocks together as a unit.

These assembly bolts 63 are of such a length that they not only pass through the blocks and nuts 65 but extend outwardly therefrom for cooperation with wing nuts 67. After the block has been initially assembled with the bolts 63, passing through the bulkhead 1, blocks 15 and 17 and nuts 65 and before the nuts 67 are placed on the bolts, an insulating cover plate 69 is slipped over the top, bottom and free side of the unit. This cover plate 69 may be made of some suitable transparent plastic material and is substantially U-shaped in cross-section. In the parallel sides thereof spaced grooves 71 are cut in the cover in such a manner that when the cover is slid over the assembled connector block the grooves 71 will be above the enlarged annular flanges 11 of the plugs 9 and thus retain them in fixed position. The edges of the sides of the cover 69 are adapted to fit within the longitudinal grooves 73 formed on the inner insulating plug 17 which is in contact with the bulkhead 1. The wing nuts 67 retain the unit, including the cover, in place, and if desired a conventional wire-lead frangible seal may be attached to the wing nuts by an authorized person, and while the seal is intact it will be known that the connector block has not been tampered with.

I claim:

1. A detachable multiple circuit terminal block including in combination a pair of parallel arranged insulating strips, one a base strip, the other a cover strip, means for holding the strips in abutting relation, each of said strips having a plurality of outwardly extending spaced partitions defining pockets therebetween, electrical conducting bars positioned in and extending into complementary pockets in both said insulating strips, wire receiving openings formed adjacent the ends of the electric conducting bars and openings formed in each of said insulating strips registering with the wire receiving openings in the conducting bars when the insulating strips are placed in parallel arrangement, and a U-shaped cover overlying the top and sides of the assembled terminal block, the said cover having spaced parallel slots in the sides thereof overlying the wire receiving openings in the conducting bars and the openings in the parallel arranged insulating strips, means to secure the free ends of said cover to said base strip to prevent lateral displacement of said cover.

2. A multiple circuit terminal block including in combination a pair of parallel arranged insulating strips, one a base strip, the other a cover strip, each of said strips having a plurality of spaced partitions defining pockets therebetween, electrical conducting bars positioned in and extending into complementary pockets in both said insulating strips, wire receiving openings formed adjacent the ends of the electric conducting bars and complementary openings formed in each of said insulating strips registering with the wire receiving openings in the conducting bars when the insulating strips are placed in parallel arrangement, and a U-shaped cover overlying one end and the sides of the assembled terminal block, the said cover having spaced parallel slots in the sides thereof overlying the wire receiving opening in the conducting bars and the complementary openings in parallel arranged insulating strips, the side edges of the U-shaped cover being retained in longitudinal grooves extending outwardly from the lower side walls of the inner insulating strip.

3. A multiple circuit terminal block including in combination a pair of parallel arranged insulating strips, one a base strip, the other a cover strip, each of said strips having a plurality of spaced partitions defining pockets therebetween, electrical conducting bars positioned in and extending into complementary pockets in both said insulating strips, wire receiving openings formed adjacent the ends of the electric conducting bars and complementary openings formed in each of said insulating strips registering with the wire receiving openings in the conducting bars when the insulating strips are placed in parallel arrangement, and a U-shaped cover overlying one end and the sides of the assembled terminal block, the said cover having spaced parallel slots in the sides thereof overlying the wire receiving opening in the conducting bars and the complementary openings in parallel arranged insulating strips, the side edges of the U-shaped cover being retained in longitudinal grooves extending outwardly from the lower side walls of the inner insulating strip, and fastening means passing through the pair of insulating strips and cover.

4. A multiple circuit terminal box comprising a pair of insulating strips, each of said strips having a plurality of outwardly extending spaced partitions adapted to abut when arranged in parallel relation, openings in the sides between the partitions of each insulating strip, electrically conducting units extending into the spaces defined by the partitions of each insulating strip, the said electrical conducting units having a pair of spaced parallel bars joined adjacent their ends by spaced apart electrical plug receiving tubes extending through the said bars, the pairs of spaced parallel bars of each unit engaging the spaces defined by the partitions in each of the said insulating strips and with the open ends of the electrical plug receiving tubes in alignment with the said openings in the sides between the partitions of each insulating strip.

5. A multiple circuit terminal block including in combination two box-like insulating members having a plurality of dividing partitions therein adapted to be arranged to face one another in assembled position, openings formed in the side walls of the box-like insulating members between the said dividing partitions, conducting units extending into complementary spaces formed by said partitions, comprising spaced parallel bars joined to each other by spaced parallel wire receiving tubes positioned in complementary partitioned sections of box-like members, the ends of said wire receiving tubes registering with the said openings formed in the side walls of the box-like insulating member.

6. An electrical detachable conducting plug socket comprising a pair of tubular members having interior bores of the approximate diameter as the cooperating detachable plugs to be inserted in the said bore, a pair of spaced parallel conducting bars having openings therein for the reception and retention of the said tubular members, the sections of the tubular members lying between the conducting bars having longitudinal cut-away portions exposing their interior bores and circumferential clips extending around the uncut portions of the tubular members with the side edges of the clips lying slightly within the radius of the interior bores of the tubular members whereby the side edges of the clips are frictionally engaged by the peripheries of the cooperating detachable plugs insertable in the open ends of the tubular members.

7. A detachable multiple plug electric conducting unit adapted to be mounted in an insulating block comprising a pair of flat, vertically spaced, horizontal metal bars, openings adjacent the ends of each of said bars, hollow cylindrical members having end openings for the reception of plug terminals secured through the openings in the said bars, cut-away portions formed in the hollow cylindrical members intermediate the end bars, and U-shaped clips having inturned side edges positioned over the uncut portions of the hollow cylindrical members with the inturned side edges thereof extending into the bore of the hollow cylindrical members whereby the inturned side edges will be engaged by a plug terminal inserted into the ends of hollow cylindrical members.

8. A detachable electrical plug connection comprising a spaced apart pair of tubular members having bores of approximately the diameter of the cooperating detachable plug, the ends of the tubular members passing through conductor bars, the side walls of the tubular members being cut away through slightly less than one-half their diameters and U-shaped metal clips surrounding the uncut portions of the tubular members, the side edges of the U-shaped clips being bent inwardly over the edges of the cut-away portions to the same plane whereby the straight edges of the spring clip are contacted by a cooperating plug inserted into one end of the tubular members.

RICHARD A. ENGELHARDT.

REFERENCES CITED

The following references are of record in the file of this patent:

UNITED STATES PATENTS

| Number | Name | Date |
|---|---|---|
| 2,039,916 | McIntosh | May 5, 1936 |
| 2,178,092 | Werner | Oct. 31, 1939 |
| 2,198,193 | Drachman et al. | Apr. 23, 1940 |
| 2,327,048 | Joyce | Aug. 17, 1943 |

FOREIGN PATENTS

| Number | Country | Date |
|---|---|---|
| 286,966 | Great Britain | 1928 |
| 543,900 | Great Britain | Mar. 18, 1942 |
| 547,198 | Great Britain | 1942 |